US009396415B2

(12) United States Patent
Chertok et al.

(10) Patent No.: US 9,396,415 B2
(45) Date of Patent: Jul. 19, 2016

(54) NEURAL NETWORK IMAGE REPRESENTATION

(71) Applicant: SUPERFISH LTD., Petah-Tikva (IL)

(72) Inventors: Michael Chertok, Raanana (IL); Alexander Lorbert, Givat Shmuel (IL); Adi Pinhas, Hod Hasharon (IL)

(73) Assignee: SUPERFISH LTD., Petah-Tikva (IL)

( * ) Notice: Subject to any disclaimer, the term of this patent is extended or adjusted under 35 U.S.C. 154(b) by 0 days.

(21) Appl. No.: 14/676,404

(22) Filed: Apr. 1, 2015

(65) Prior Publication Data

US 2015/0278642 A1    Oct. 1, 2015

(30) Foreign Application Priority Data

Apr. 1, 2014    (IL) .......................................... 231862

(51) Int. Cl.
| | |
|---|---|
| *G06K 9/00* | (2006.01) |
| *G06K 9/62* | (2006.01) |
| *G06N 3/02* | (2006.01) |
| *G06N 7/04* | (2006.01) |
| *G06K 7/14* | (2006.01) |
| *G06K 9/46* | (2006.01) |

(52) U.S. Cl.
CPC .............. *G06K 9/627* (2013.01); *G06K 7/1482* (2013.01); *G06K 9/469* (2013.01); *G06N 3/02* (2013.01); *G06N 7/046* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2005/0185835 | A1* | 8/2005 | Matsugu | G06K 9/4619 382/159 |
| 2006/0204053 | A1* | 9/2006 | Mori | G06K 9/00 382/118 |
| 2007/0244842 | A1* | 10/2007 | Ishii | G06K 9/4628 706/18 |
| 2009/0297007 | A1* | 12/2009 | Cosatto | G06K 9/00147 382/131 |
| 2010/0183217 | A1* | 7/2010 | Seung | G06K 9/342 382/156 |
| 2010/0266200 | A1 | 10/2010 | Atallah et al. | |

OTHER PUBLICATIONS

Krizhevsky et al. "ImageNet Classification with Deep Convolutional Neural Networks." *Proceedings from the Conf. on Neural Information Processing Systems*. 2012 (9 pages).
Simonyan et al. "Deep Inside Convolutional Networks: Visualising Image Classification Models and Saliency Maps." http://arxiv.org/abs/1312.6034 2013. (8 pages).
Zeiler et al. "Visualizing and Understanding Convolutional Networks." http://arxiv.org/abs/1311.2901v3_2013. (11 pages).

* cited by examiner

*Primary Examiner* — Utpal Shah
(74) *Attorney, Agent, or Firm* — Merchant & Gould P.C.

(57) ABSTRACT

A method for representing an input image includes the steps of applying a trained neural network on the input image, selecting a plurality of feature maps, determining a location of each of the plurality of feature maps in an image space of the input image, defining a plurality of interest points of the input image, and employing the plurality of interest points for representing the input image for performing a visual task. The plurality of feature maps are selected of an output of at least one selected layer of the trained neural network according to values attributed to the plurality of feature maps by the trained neural network. The plurality of interest points of the input image are defined based on the locations corresponding to the plurality of feature maps.

6 Claims, 4 Drawing Sheets

NEURAL NETWORK IMAGE REPRESENTATION

This application claims benefit of Serial No. 231862, filed 1 Apr. 2014 in Israel and which application is incorporated herein by reference. To the extent appropriate, a claim of priority is made to the above disclosed application.

FIELD OF THE DISCLOSED TECHNIQUE

The disclosed technique relates to image representation in general, and to methods and systems for representing an input image as a graph according to interest points detected by applying a trained convolutional neural network on the input image, in particular.

BACKGROUND OF THE DISCLOSED TECHNIQUE

For many visual tasks, the manner in which the image is represented can have a substantial effect on both the performance and the results of the visual task. Convolutional neural networks (CNN), as known in the art, can learn to produce multiscale representations of an image. The features extracted by the convolutional neural networks are features that are pertinent to the image on which the convolutional network is applied.

An article by Krizhevsky et al., entitled "ImageNet Classification with Deep Convolutional Neural Networks" published in the proceedings from the conference on Neural Information Processing Systems 2012, describes the architecture and operation of a deep convolutional neural network. The CNN of this publication includes eight learned layers (five convolutional layers and three fully-connected layers). The pooling layers in this publication include overlapping tiles covering their respective input in an overlapping manner. The detailed CNN is employed for image classification.

An article by Zeiler et al., entitled "Visualizing and Understanding Convolutional Networks" published on http:/arxiv.org/abs/1311.2901v3, is directed to a visualization technique that gives insight into the function of intermediate feature layers of a CNN. The visualization technique shows a plausible and interpretable input pattern (situated in the original input image space) that gives rise to a given activation in the feature maps. The visualization technique employs a multi-layered de-convolutional network. A de-convolutional network employs the same components as a convolutional network (e.g., filtering and pooling) but in reverse. Thus, this article describes mapping detected features in the produced feature maps to the image space of the input image. In this article, the de-convolutional networks are employed as a probe of an already trained convolutional network.

An article by Simonyan et al., entitled "Deep Inside Convolutional Networks: Visualizing Image Classification Models and Saliency Maps" published on http:/arxiv.org/abs/1312.6034, is directed to visualization of image classification models, learnt using deep Convolutional Networks (ConvNets). This article describes two visualization techniques. The first one generates an image for maximizing the class score based on computing the gradient of the class score with respect to the input image. The second one involves computing a class saliency map, specific to a given image and class.

Reference is now made to US Patent Application Publication Number 2010/0266200 to Atallah et al., and entitled "Image Analysis through Neutral Network Using Image Average Color". This publication is directed at a computer-implemented image system. The system includes an analysis component and a classification component. The analysis component analyzes image characteristics of an image that includes an average color value. The classification component includes a self-organizing map (e.g., Kohonen neural network) for classifying the image relative to a second image based on classification information computed from the average color value.

SUMMARY OF THE PRESENT DISCLOSED TECHNIQUE

It is an object of the disclosed technique to provide a novel method and system for representing an input image as a set of interest points detected by applying a trained Neural Network (NN) on the input image. In accordance with an embodiment of the disclosed technique, there is thus provided a method for representing an input image. The method includes the steps of applying a trained neural network on the input image, selecting a plurality of feature maps of an output of at least one selected layer of the trained neural network, determining a location corresponding to each of the plurality of feature maps in an image space of the input image, and defining a plurality of interest points of the input image for representing said input image. The feature maps are selected according to values attributed thereto by the trained neural network. The interest points are defined based on the determined locations corresponding to the feature maps.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a method and a system for representing an input image as a set of interest points (or key points) detected by applying a trained Neural Network (e.g., a Convolutional Neural Network—CNN) on the input image. The input image is run through the trained CNN and the most prominent extracted features (i.e., salient features) of the layers of the trained CNN are back-projected onto the image space of the original input image. The back-projected features are all combined into a single intensity map, or heat map. Interest points are extracted from the heat map. Each interest point is defined by a distinct location in the image space of the input image, and can be associated with a respective descriptor. Furthermore, the geometric relations between the extracted interest points are determined according to the locations of the interest points.

Thereafter, the input image can be represented as a graph according to the extracted interest points and the geometric relations between the interest points. The graph representation of the input image can then be employed for various visual tasks, such as determining image similarity, similarity-based image search, and the like.

It is noted that the features detected by applying the trained CNN on the input image are features that are relevant to the input image. That is, the input image is expressed through the features that are attributed with the greatest values, and which can therefore be considered as most pertinent to the image. In particular, the input image might be better expressed by the features learned and detected by the CNN, than by predetermined conventional features not adapted specifically to the analyzed input image. Thus, these high value features represent the input image in an optimized manner and can provide better results when employed for various visual tasks (as compared to conventional features). To sum up, the disclosed technique represents an image by employing key points (interest points) that correspond to multi-scale salient features of the image as detected by the CNN.

Figure 1A:
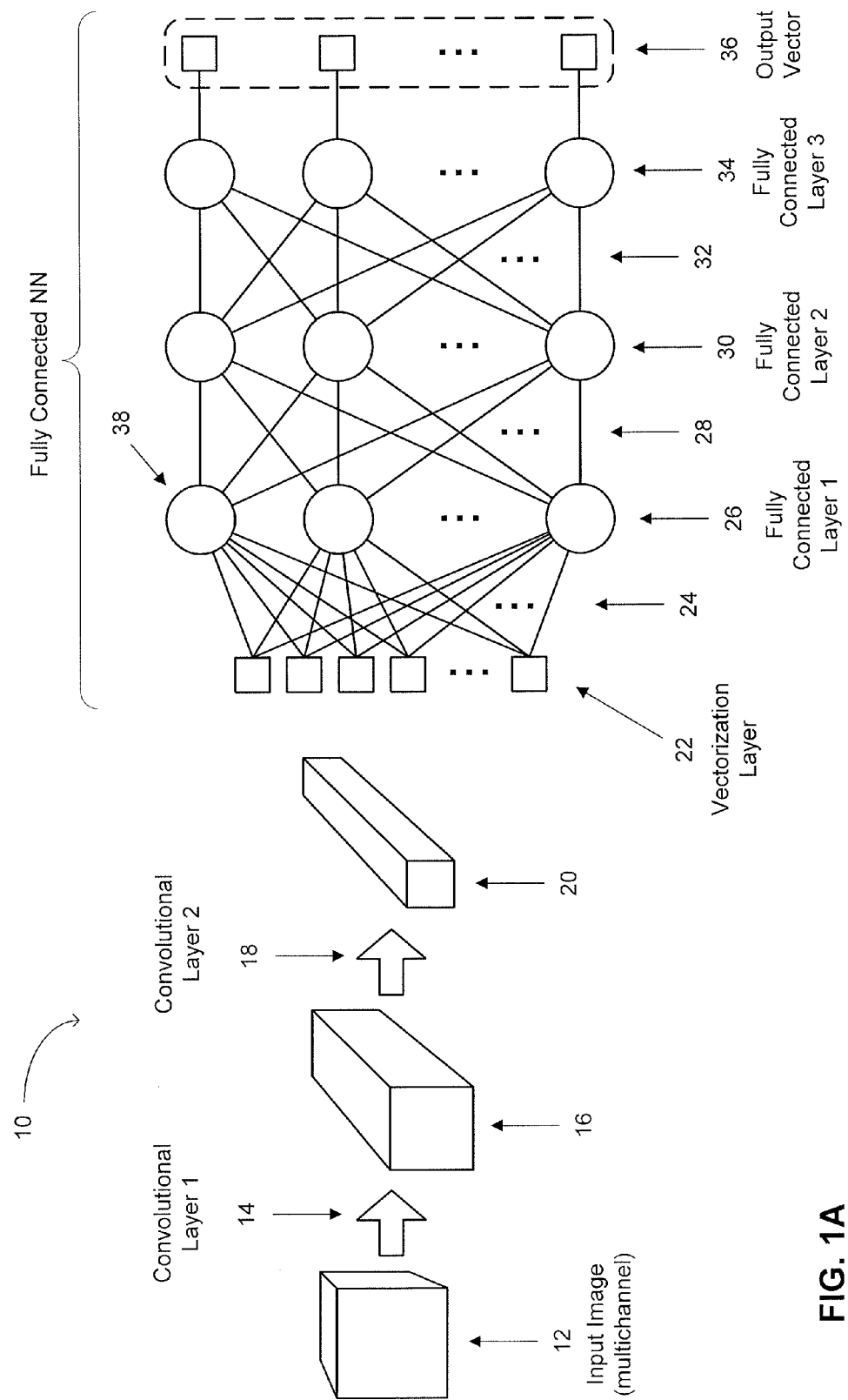
FIGS. 1A and 1B are schematic illustrations of a convolutional neural network, constructed and operative in accordance with an embodiment of the disclosed technique.
Figure 1B:
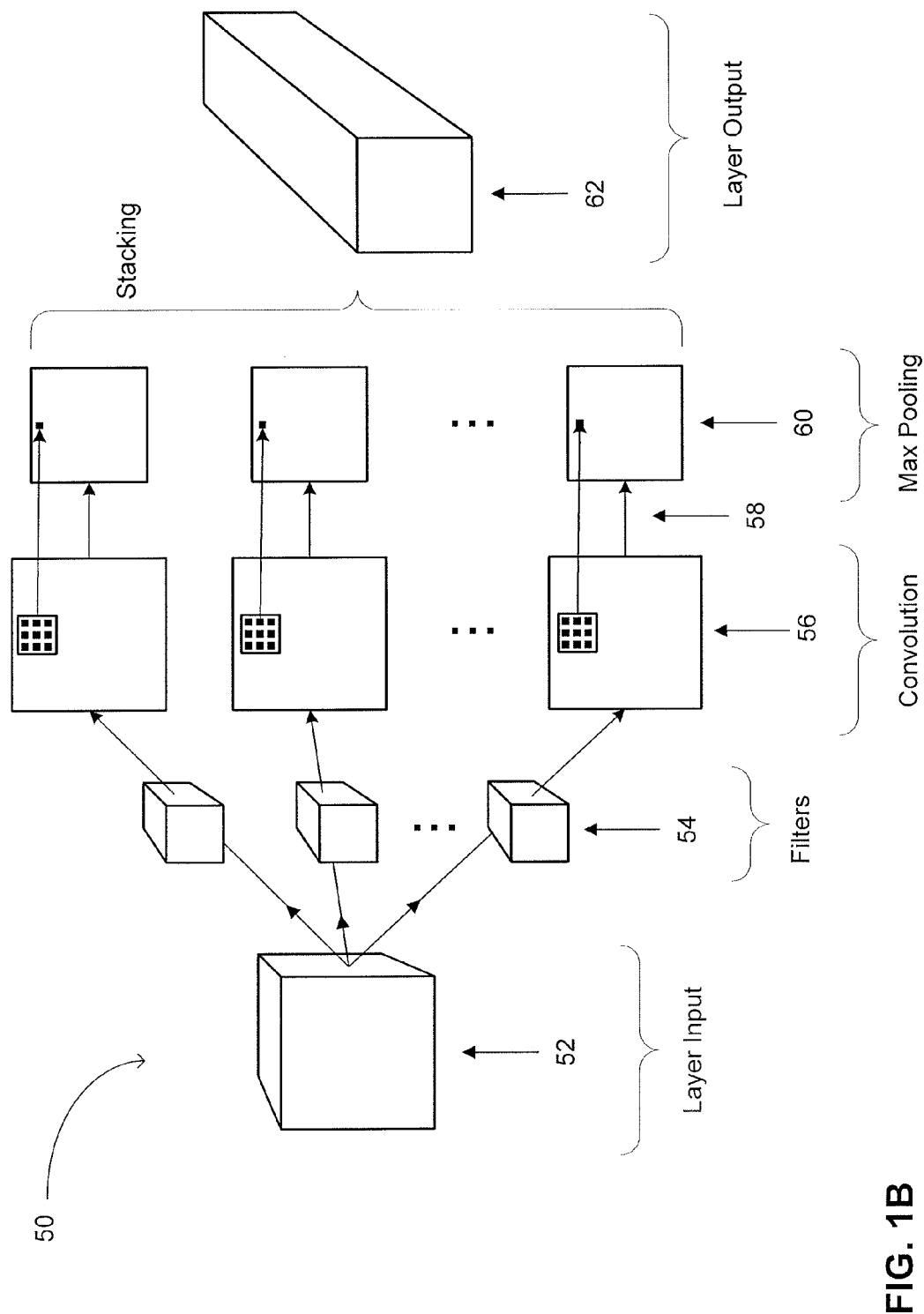

Reference is now made to FIGS. 1A and 1B, which are schematic illustrations of a Convolutional Neural Network (CNN), generally referenced 10, constructed and operative in accordance with an embodiment of the disclosed technique. FIG. 1A depicts an overview of CNN 10, and FIG. 1B depicts a selected convolutional layer of CNN 10.

With reference to FIG. 1A, CNN 10 includes an input image 12, followed by first and second convolutional layers 14 and 18 with respective outputs 16 and 20. It is noted that CNN 10 can include more, or less, convolutional layers. The output of second convolutional layer 20 is then vectorized in vectorizing layer 22. A vectoriziation output 24 is fed into a layered, fully connected, neural network (not referenced). In the example set forth in FIG. 1A, in the fully connected neural network of CNN 10 there are three fully connected layers 26, 30 and 34—more, or less, layers are possible.

Each of fully connected layers 26, 30 and 34 comprises a variable number of linear, or affine, operators potentially followed by a nonlinear activation function. The last fully connected layer 34 is typically a normalization layer so that the final elements of an output vector 36 are bounded in some fixed, interpretable range. The parameters of each convolutional layer and each fully connected layer are set during a training (i.e., learning) period of CNN 10.

The structure and operation of each of the convolutional layers and the fully connected layers is further detailed in the following paragraphs. With reference to FIG. 1B, each input to a convolutional layer is a multichannel feature map 52 that is represented by a three-dimensional (3D) matrix. For example, a color input image may contain the various color intensity channels. The depth dimension of the input 3D matrix, representing feature map 52, is defined by the channels of multichannel feature map 52. For instance, for an input image having three color channels, the 3D matrix could be an M×N×3 matrix (i.e., the depth dimension has a value of three). The horizontal and vertical dimensions of 3D matrix 52 (i.e., the height and width of matrix 52) are defined by the respective dimensions of the input image.

The input is convolved with filters 54 that are set in the training stage of CNN 10. While each of filters 54 has the same depth as input feature map 52, the horizontal and vertical dimensions of the filter may vary. Each of the filters 54 is convolved with the layer input 52 to generate a two-dimensional (2D) matrix 56.

Subsequently, an optional max pooling operation 58 is applied to produce feature maps 60. In other words, the output of convolutional layer 56 enters max pooling layer 58 (i.e., performing the max pooling operation) whose outputs are feature maps 60. These 2D feature maps 60 are then stacked to yield a 3D output matrix 62. Both convolution and max pooling operations contain various strides (or incremental steps) by which the respective input is horizontally and vertically traversed.

Each of convolutional layer outputs 16 and 20, and fully connected layer outputs 28, 32, and 36, details the image structures (i.e., features) that best matched the filters of the respective layer, thereby "detecting" those image structures. In general, each of convolutional layer outputs 16 and 20, and fully connected layer outputs 28, 32, and 36, detects image structures in an escalating manner such that the deeper layers detect features of greater complexity. For example, it has been empirically demonstrated that the first convolutional layer 14 detects edges, and the second convolutional layer 18, which is deeper than first layer 14, may detect object attributes, such as curvature and texture. It is noted that CNN 10 (FIG. 1A) can include other numbers of convolutional layers, such as a single layer, four layers, five layers and the like.

Max pooling layer 58 selects the input feature maps of greatest value (i.e., indicating that the filters that produced those largest feature map values can serve as salient feature detectors). Max pooling layer 58 demarcates its input into a set of overlapping or non-overlapping tiles and for each such tile, outputs the maximum value. Thus, max-pooling layer 58 reduces the computational cost for deeper layers (i.e., max pooling layer 58 serves as a sub-sampling or down-sampling layer).

It is noted that a convolution layer can be augmented with rectified linear operation and a max pooling layer 58 can be augmented with normalization (e.g., local response normalization—as described, for example, in the Krizhevsky article referenced in the background section herein above). Alternatively, max pooling layer 58 can be replaced by another feature-pooling layer, such as average pooling layer, a quantile pooling layer, or rank pooling layer. Fully connected layers 26, 30, and 34 operate as a Multilayer Perceptron (MLP).

In the example set forth in FIGS. 1A and 1B, CNN 10 includes two convolutional layers and three fully connected layers. However, the disclosed technique can be implemented by employing CNNs having more, or less, layers (e.g., three convolutional layers and five fully connected layers). Moreover, other parameters and characteristics of the CNN can be adapted according to the specific task, available resources, user preferences, the training set, the input image, and the like. Additionally, the disclosed technique is also applicable to other types of artificial neural networks (besides CNNs).

It is noted that the salient features detected by the neural network are regions, or patches, of the input image which are attributed with high values when convolved with the filters of the neural network. For example, the salient features can vary between simple corners to semantic object parts, such as an eye of a person, a whole head or face, or a car wheel, depending on the input image.

Figure 2:
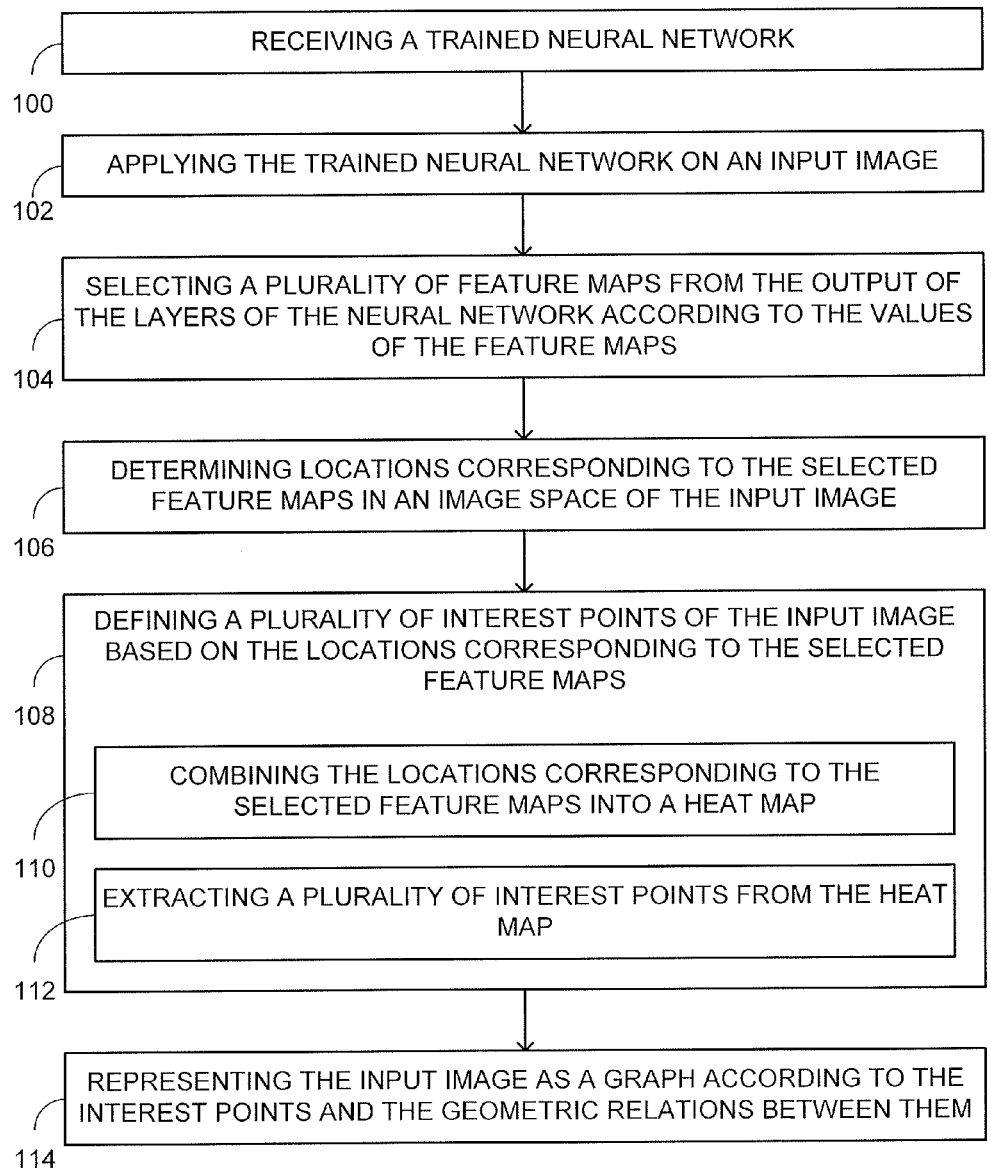
FIG. 2 is a schematic illustration of a method for representing an input image as a graph according to interest points detected by applying a trained convolutional neural network on the input image, operative in accordance with another embodiment of the disclosed technique.

Reference is now made to FIG. 2, which is a schematic illustration of a method for representing an input image as a graph according to interest points detected by applying a trained convolutional neural network on the input image, operative in accordance with another embodiment of the disclosed technique. In procedure 100, a trained Neural Network (e.g., a trained Convolutional Neural Network—CNN) is received. The CNN may include convolutional layers and fully connected layers. With reference to FIG. 1A, CNN 10 is received after being trained with a selected training set.

In procedure 102, the trained CNN is applied on an input image. The input image may, or may not, be related to the training set employed for training the neural network. That is, there is no requirement to use a training image, or to use an image from an image class found in the training set. The input image conforms to the expected input dimensions of the trained CNN. As such, the input image may require resizing and cropping, for example, for adapting it to the input dimensions of the CNN. Additionally, a pixel-based mean image, as determined in the training phase (i.e., mean image of the image training set), may be subtracted from the input image. With reference to FIG. 1A, input image 12 is inputted into CNN 10 as a multichannel feature map represented by a 3D matrix. In general, the input image has to undergo the same (or similar) preprocessing, which was applied to every image when training the neural network.

In procedure 104, a plurality of feature maps from the output of the layers of the neural network are selected according to their values. The feature maps are produced in response to convolution of the various filters with the layer input. In particular, for each layer of the trained CNN, feature maps that are attributed with the top ranked values, are selected. That is, the highest valued feature maps at the output of the convolutional layer (or the fully connected layer) are selected. Alternatively, the highest valued feature maps can be selected at any stage following the convolution operation, for example prior to max pooling (i.e., even if the convolutional layer includes the optional max pooling operation).

The applied filters of the layers of the trained CNN serve as feature detectors that detect the locations of the layer input that have high correspondence with the filters. The feature maps having the top ranked values (i.e., also referred to as top ranked feature maps or top ranked values) represent the locations within the layer input that showed the greatest correspondence to the applied filters. Thus, the top ranked values represent salient features of the layer input as detected by the filter detectors of the respective layer.

It is noted that the top ranked values can be selected "on the fly" during application of the trained CNN on the input image. That is, as a convolutional layer processes its respective input and produces respective output, the largest output values are selected. The top ranked values can be selected such that a selected percentage or quantity of values is selected (e.g., the upper 15% or the largest 1000 values), or can be selected such that only values exceeding a threshold are selected. With reference to FIG. 1B, the greatest values of layer output 62 are selected.

In procedure 106, the locations corresponding to the selected feature maps (i.e., feature maps having the top ranked values) in an image space of the input image, are determined. The determination of these locations within the image space of the input image is also referred to herein as back-projection of the features that are represented by the selected top ranked values. In other words, in the back-projection process, each selected top ranked value (i.e., high value feature map), selected for each layer of the CNN, is mapped back to the image space of the original image.

The back-projection of the top ranked values to the image space of the input image is performed, for example, by employing a de-convolutional network. Alternatively, the back-projection is performed by a simple backpropagation (e.g., neural network technique used for training, as described, for example, in the Simonyan article referenced in the background section herein above). In particular, and as described, for example, in the Zeiler article referenced in the background section herein above, to approximately invert the convolutional step we may use any technique from the Blind Source Separation field, for example, a sparsity-based approach. Alternatively, a matched filter approach can be employed for inverting the convolutional step. To approximately invert the max pooling operation the stored masks can be used to place the max values in their appropriate input locations (i.e., zeroes are placed by default).

Generally, any technique for mapping the selected high valued feature maps back to the image space of the input image can be applied. For example, the method of the disclosed technique can involve tracking all potential features (i.e., image patches or image regions detected by the neural network) throughout the network, thereby avoiding the need for back-projecting the features. For example, a selected image patch at the input to the first layer is tracked and the value attributed to that image patch by each of the filters of the first layer is recorded. Thus, the output of the first layer that is associated with the selected image patch is known. Similarly, the output of the first layer, associated with the selected image patch, that enters the second layer as input, is tracked, and so forth. Thereby, the output of each subsequent layer that is associated with the selected image patch is determined. With reference to FIG. 1A, the selected highest (top ranked) values are back-projected to the image space of input image 12.

In procedure 108, a plurality of interest points of the input image are defined based on the locations corresponding to the selected feature maps. Each interest point is associated with a distinct position within the image space of the input image. Thus, the geometric relations between the interest points (e.g., the distances and/or the angles between the interest points) can be determined according to the location of each interest point. Additionally, a descriptor can be determined for each interest point. The descriptor of an interest point provides further information about the interest point. For example, in case the interest points are employed for determining image similarity, an interest point of a first image should not be compared to an interest point of a second image, having a completely different descriptor. In this manner, computational resources can be saved during image similarity determination, and other visual tasks related thereto.

In accordance with the simplest (though not the most cost effective) embodiment of the disclose technique, the locations determined in the back-projection step are defined as the interest points of the input image. In this case, after procedure 108, the method continues in procedure 114. However, for reducing the number of interest points (i.e., thereby reducing the computational cost of the visual task performed based on the representation of the input image) only a subset of the back-projected locations are employed as interest points for representing the input image. Furthermore, the selected subset of interest points should preferably correspond to the more prominent features detected by the different layers of the CNN. Thus, for choosing the interest points that correspond to the highest back-projected values (i.e., corresponding to the most prominent salient features detected by the different layers of the CNN), the method of the disclosed technique may include additional sub-steps 110 and 112 as detailed herein below.

In procedure 110, the locations corresponding to the selected feature maps are combined into a heat map. The heat map includes the selected top ranked values, each located in a location determined in the back-projection process. Thereby, the heat map combines values representing salient features extracted from all layers of the CNN (i.e., features of various scale levels). Alternatively, a respective heat map is generated for each layer of the network. Thus, key points detected by each layer can be selected separately. Thereby, for example, knowledge of the scale level of each key point can be maintained and each layer can be represented separately. With reference to FIG. 1A, the selected highest values (i.e., the locations corresponding to the selected feature maps attributed with the top ranked values) are combined into a heat map. Each selected value is located in its respective location within the image space of input image 12 as determined by back-projection.

In procedure 112, a plurality of interest points are extracted from the heat map (or heat maps). The interest points can be, for example, the peaks in the intensity map (e.g., global peaks or local peaks). Alternatively, the interest points are the centers of the densest portions of the heat map. Generally, any intensity based method for selecting key points out of the locations determined by back-projection of the detected salient features can be employed. The extracted interest points are employed for representing the input image for performing various visual tasks. With reference to FIG. 1A, interest points are extracted from the heat map, and can be employed for representing input image 12.

In procedure 114, the input image is represented as a graph according to the extracted interest points and the geometric relations between them. The geometric relations between the interest points can be, for example, the distance between pairs of points and the angles between triplets of points. The graph image representation maintains data respective of the geometric relations between the interest points and thereby, can improve the results of various visual tasks, such as similarity based image search. It is noted that procedure 114 is optional and the method can stop after procedure 112 (or even after procedure 108) and represent the image as a set of key points (interest points). With reference to FIG. 1A, input image 12 is represented as a graph according to the extracted interest points and the geometric relations between the interest points.

Figure 3:
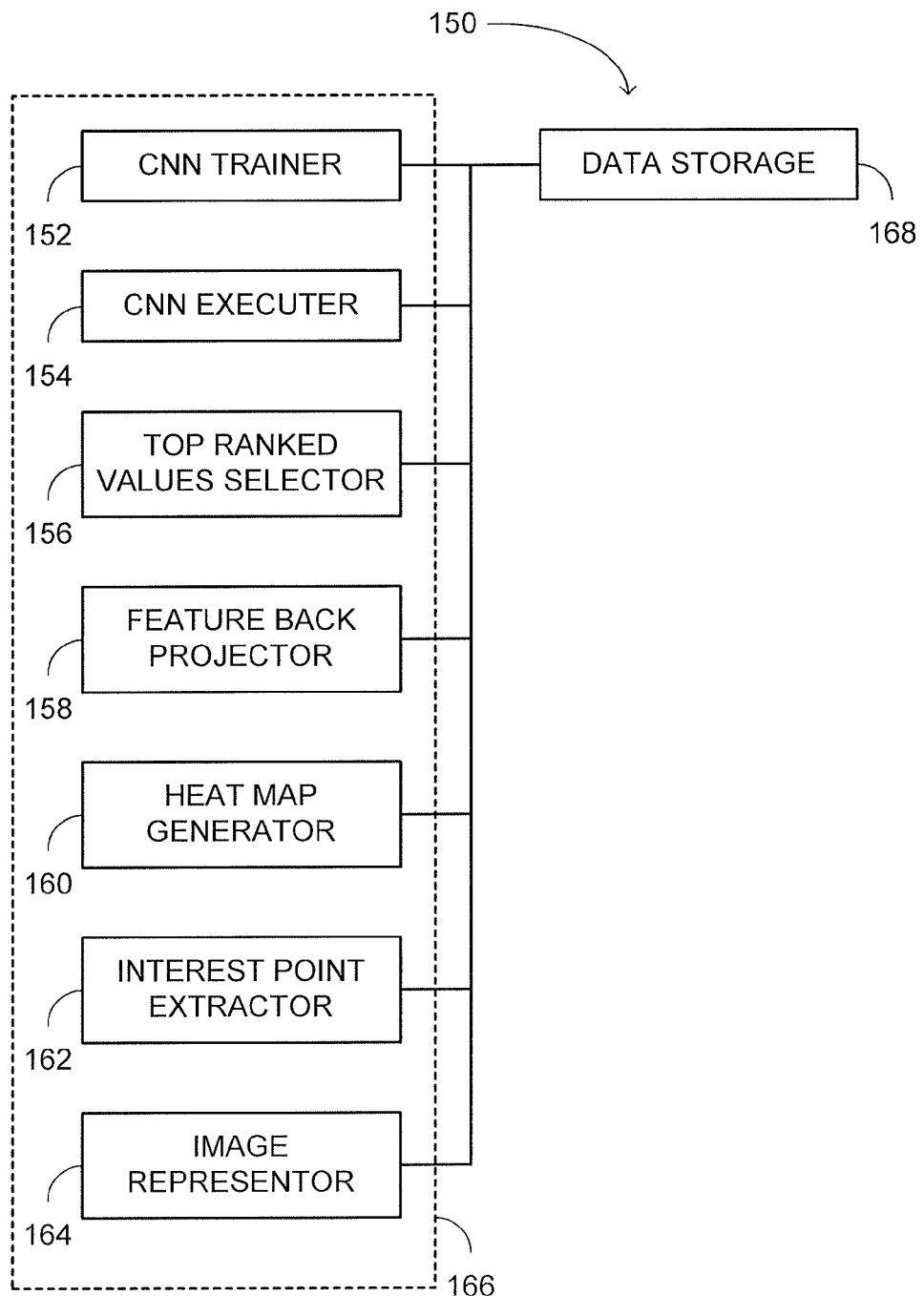
FIG. 3 is a schematic illustration of a system for representing an input image as a graph according to interest points detected by applying a trained convolutional neural network on the input image, constructed and operative in accordance with a further embodiment of the disclosed technique.

Reference is now made to FIG. 3, which is a schematic illustration of a system, generally referenced 150, for representing an input image as a graph according to interest points detected by applying a trained convolutional neural network on the input image, constructed and operative in accordance with a further embodiment of the disclosed technique. System 150 includes a CNN trainer 152, a CNN executer 154, a top ranks values selector 156, a feature back-projector 158, a heat map generator 160, an interest point extractor 162, an image representer 164, and a storage device 168.

Storage device 168 is coupled with each of CNN trainer 152, CNN executer 154, top ranked values selector 156, feature back-projector 158, heat map generator 160, interest point extractor 162, and image representer 164 for enabling the different components of system 150 to store and retrieve data. It is noted that all components except storage device 168 can be embedded on a single processing device or on an array of processing devices connected there-between. For example, components 152-164 are all embedded on a single graphics processing unit (GPU) 166, or a single Central Processing Unit (CPU) 166. Storage device 168 can be any storage device, such as a magnetic storage device (e.g., Hard Disc Drive—HDD), an optic storage device, and the like.

CNN trainer 152 retrieves a CNN architecture and a training image data set from storage device 168 or from another external data source. CNN trainer executes the CNN on any of the images of the training image data set, and accordingly trains the CNN to detect features pertinent to the images of the training image data set. CNN trainer stores the trained CNN on data storage device.

CNN executer 154 retrieves the trained CNN from storage device 168 and further retrieves an input image to be represented as a graph according to interest points detected by applying the trained CNN on the input image. CNN executer applies the trained CNN to the input image.

During execution of the trained CNN, top ranked values selector 156 selects the top ranked values produced in response to the convolution of the various filters applied on the input to the respective layer. The top ranked values indicate that the filter that produced the high value is pertinent to the input image and therefore should be included in the image graph representation.

Feature back-projector 158 retrieves the top ranked values and performs back-projection for each top ranked value. In other words, for each selected top ranked value, feature back-projector maps the top ranked value onto a respective location in the image space of the input image. That is, feature back-projector 158 determines for each selected value the location in the input image that when convolved with a respective filter of a respective convolutional layer produced the selected high value. Heat map generator 160 combines all back-projected top ranked values into a single heat map including each back-projected value positioned at its respective location within the image space of the input image, as determined by feature back-projector 158.

Interest point extractor 162 extracts interest points (e.g., intensity based interest points) from the heat map produced by heat map generator 160. Each extracted interest point is associated with a location within the image space of the input image (e.g., the coordinates of the interest point). Additionally, the interest point extractor can also determine a descriptor for each of the extracted interest points. Image representer 164 represents the input image as a graph based on the extracted interest points and the geometric relations between the interest points (e.g., distance and angles between interest points) as determined according to the location of the extracted interest points.

In the examples set forth herein above with reference to FIGS. 1A, 1B, 2 and 3, the method and system of the disclosed technique were exemplified by a CNN. However, the disclosed technique is not limited to CNNs only, and is applicable to other artificial neural networks as well. In such cases the neural network (e.g., a feed-forward neural network, or any other configuration of artificial neural network) is applied onto an input image. High value features detected by the nodes of the network are mapped back to the image space of the input image, and key points (interest points) are selected therefrom. Optionally, only a subset of the detected features are activating subsequent nodes (or are employed for detecting key points) for reducing computational cost and/or for filtering out features that are less pertinent. The key points are employed for representing the input image for performing various visual tasks. In this manner, the input image is represented by features learned and detected by the neural network that are better suited for representing the input image than conventional features (not specifically adapted to the input image).

It will be appreciated by persons skilled in the art that the disclosed technique is not limited to what has been particularly shown and described hereinabove. Rather the scope of the disclosed technique is defined only by the claims, which follow.

The invention claimed is:

1. A method for representing an input image, the method comprising the following procedures:
   applying a trained neural network on said input image;
   selecting a plurality of feature maps of an output of at least one selected layer of said trained neural network according to values attributed to said plurality of feature maps by said trained neural network;

for each of said plurality of feature maps, determining a location corresponding thereto in an image space of said input image;

defining a plurality of interest points of said input image, based on said locations corresponding to said plurality of feature maps; and representing said input image as a graph according to said plurality of interest points and according to geometric relations between interest points of said plurality of interest points;

employing said graph for performing said visual task;

wherein said graph comprises a plurality of vertices and edges; and wherein said graph maintains data respective of said geometric relations between said interest points.

2. The method of claim 1, wherein said plurality of feature maps are selected according to a selected criterion of the list consisting of:

said values attributed to said plurality of feature maps exceed a threshold;

said values attributed to said plurality of feature maps being the N highest values; and said values attributed to said plurality of feature maps being in the upper P % of values, wherein N and P are selected numerical values.

3. The method of claim 1, wherein said procedure of defining said plurality of interest points comprises the sub-procedures of:

combining said locations corresponding to said plurality of feature maps into at least one heat map; and extracting said plurality of interest points from said at least one heat map.

4. The method of claim 3, wherein each interest point of said plurality of interest points being an intensity peak of said at least one heat map.

5. The method of claim 3, wherein each interest point of said plurality of interest points being a center of a region of said at least one heat map having high density of said locations corresponding to said plurality of feature maps, and wherein said region of said at least one heat map having high density of said locations being selected from the list consisting of:

regions having density value exceeding a threshold;

N regions having the highest density values; and regions in the upper P % of density values, wherein N and P are selected numerical values.

6. The method of claim 1, further comprising the procedure of associating each one of said plurality of interest points with a respective descriptor before said procedure of representing said input image as a graph.

* * * * *